United States Patent [19]

Scott

[11] 4,434,467
[45] Feb. 28, 1984

[54] HAIR COLORING CALCULATOR

[76] Inventor: Dale Scott, 71925 Kempton, Rancho Mirage, Calif. 92270

[21] Appl. No.: 248,825

[22] Filed: Mar. 30, 1981

Related U.S. Application Data

[63] Continuation-in-part of Ser. No. 29,575, Apr. 12, 1979, Pat. No. 4,258,478, which is a continuation-in-part of Ser. No. 904,237, May 9, 1978, abandoned.

[51] Int. Cl.³ .............................................. G06F 15/20
[52] U.S. Cl. ...................... 364/400; 353/28; 364/518; 434/371
[58] Field of Search ....................... 364/400, 515, 518; 353/28; 434/371, 395; 358/93

[56] References Cited

U.S. PATENT DOCUMENTS 4,160,271  7/1979  Grayson et al. ................... 364/400
4,232,334  11/1980  Dyson ................................ 353/28
4,276,570  6/1981  Burson et al. ...................... 358/93

Primary Examiner—Errol A. Krass
Attorney, Agent, or Firm—Blakely, Sokoloff, Taylor & Zafman

[57] ABSTRACT

A device for determining the hair coloring products to be used to change the user's present hair color to a new hair color. The device includes a keyboard for entering a designation which identifies the user's present hair color and the desired hair color. The user also enters data to identify the particular line of hair coloring products which the user desires to use. The device then responds to such data by displaying the designations of hair coloring products of the chosen line which will change the user's present hair color to the new hair color.

19 Claims, 15 Drawing Figures

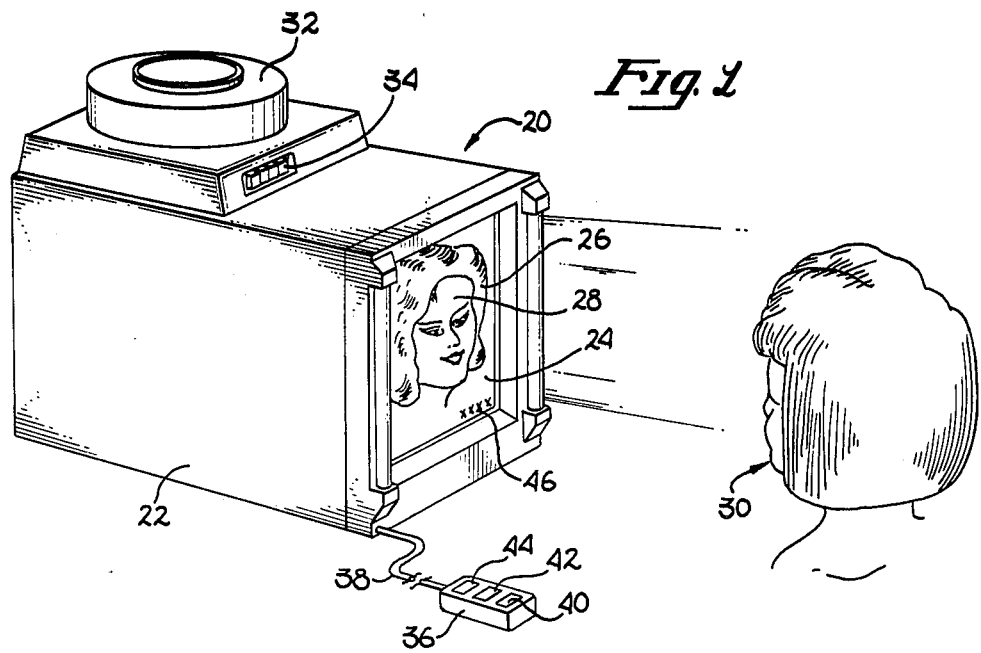
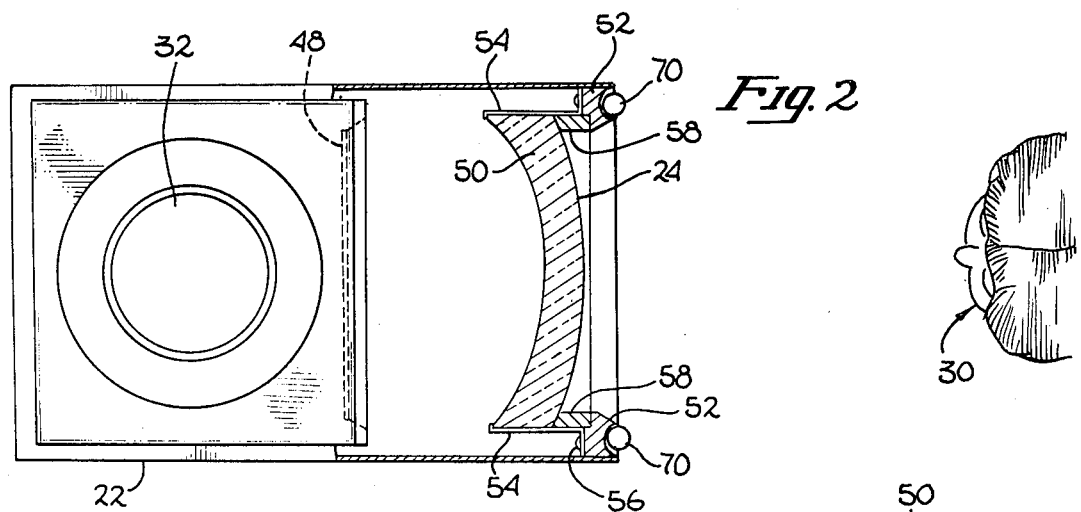
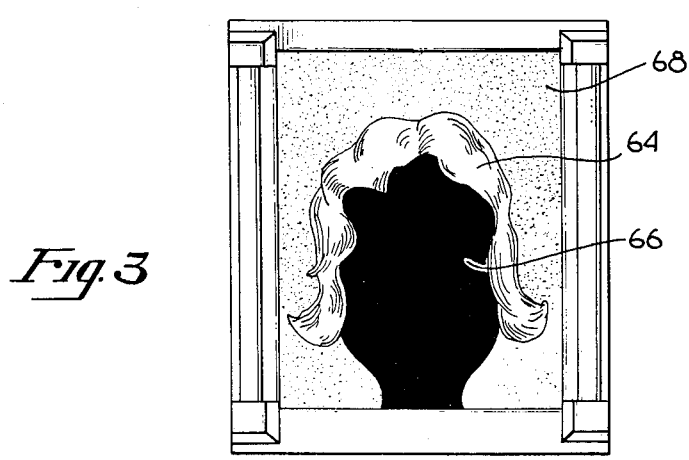
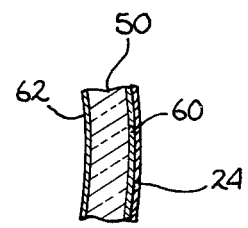

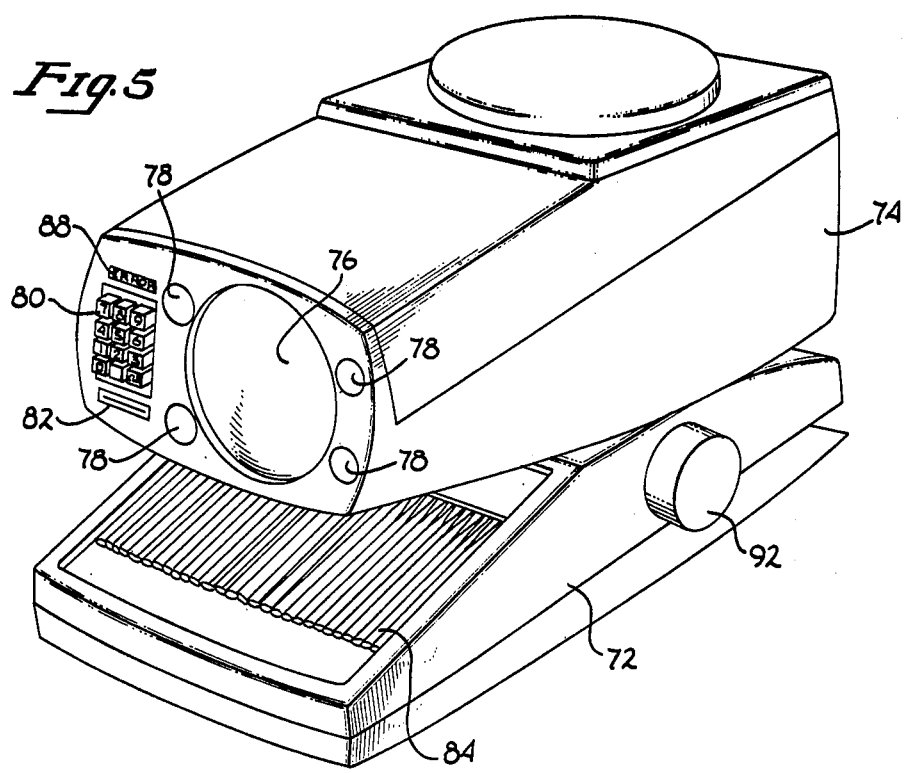
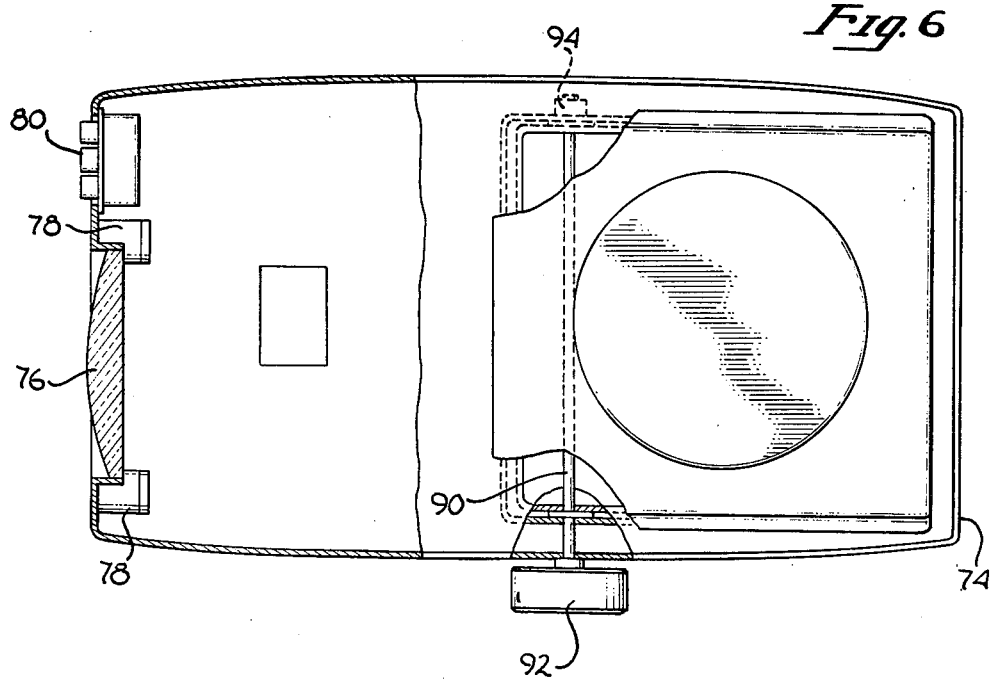

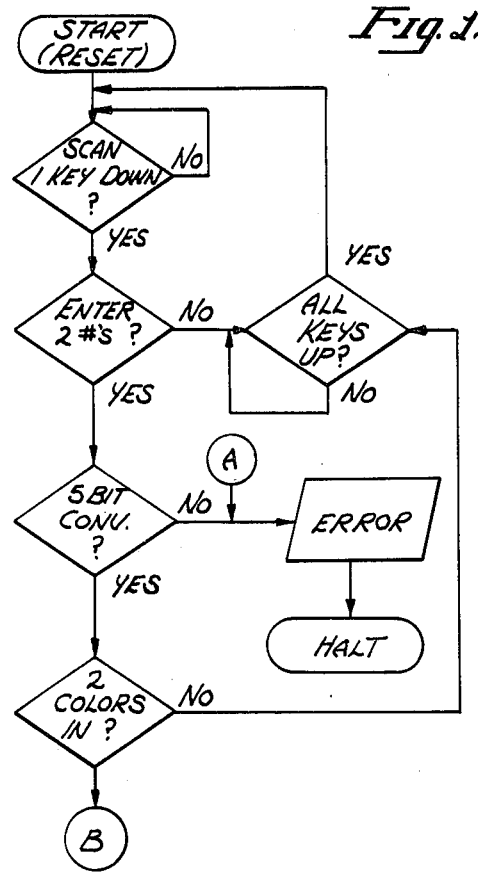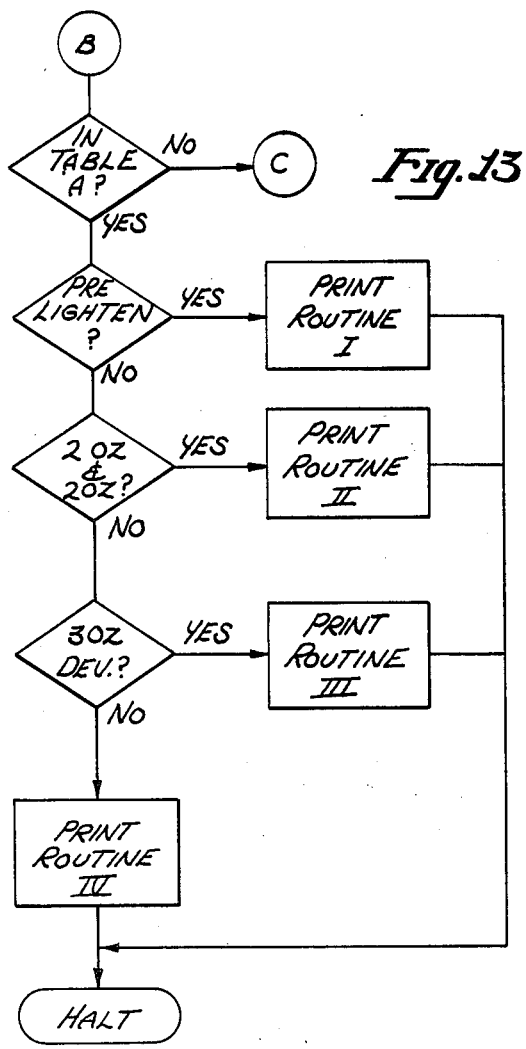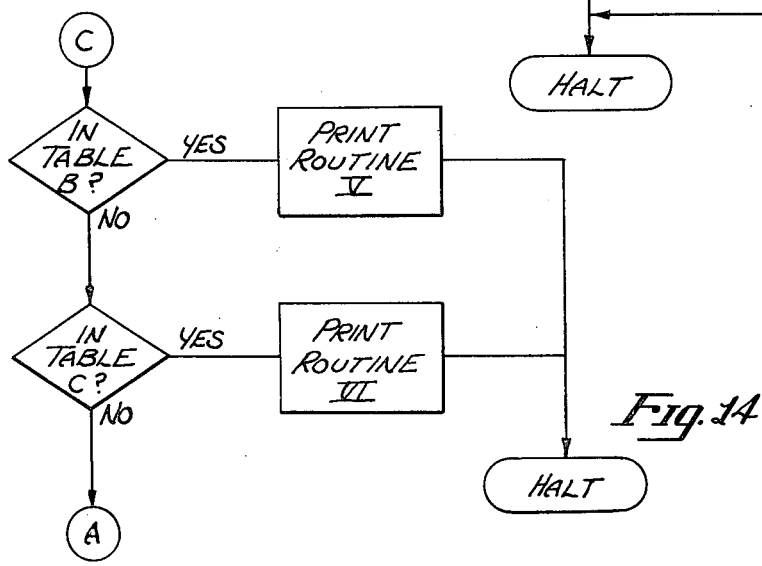
Fig. 12
Fig. 13
Fig. 14

HAIR COLORING CALCULATOR

CROSS REFERENCES TO RELATED APPLICATIONS

This application is a continuation-in-part application of a copending application entitled "FASHION PREVIEWING SYSTEM" filed Apr. 12, 1979, as Ser. No. 029,575, now U.S. Pat. No. 4,258,478 which was itself a continuation-in-part of Ser. No. 904,237 filed May 9, 1978 and now abandoned.

BACKGROUND OF THE INVENTION

1. Field of the Invention

The present invention relates to the field of hair coloring and previewing apparatus, and more particularly to fashion previewing apparatus for providing a composite image comprising the combination of the image of the viewer combined with a preselected image, such as a hair style and color.

2. Prior Art

Various types of previewing systems are well known in the prior art. Of particular interest to the present invention is the prior art relating to previewing systems for providing an optical illusion comprising the superimposition of a hair style, preferably in color, over an image of the viewer's face so that the viewer may obtain an advanced look at a proposed hair style and/or hair color change. Such equipment has direct application in beauty salons, and could be used as an aid in the presentation and sale of hair coloring compounds provided it was accompanied by appropriate coloring information and the color reproduction of the previewing system was sufficiently accurate. Obviously however, such equipment also has potential uses with respect to previewing hats, clothing, etc. as a substitute for or an extension of substantial inventories of such items in a retail outlet. In any event such equipment is known in the prior art, though prior to the present invention the quality of the illusion, the quality of the color reproduction and the versatility of the equipment were substantially limited, thereby limiting the usefulness and reliability of such equipment, particularly as a basis for making determinations with respect to hair coloring.

The inventor of the present previewing system is also the inventor or one of the inventors of prior art previewing devices disclosed in U.S. Pat. Nos. 2,545,675; 2,808,757; and 2,899,860. In the '675 patent, light from the viewer's face is reflected off a pair of mirrors in the apparatus to be presented on a backlighted screen facing the viewer, the light being focused to present the viewer's facial image by a lens in the apparatus. A plurality of transparent plates each having thereon an artistic reproduction of a coiffure are disposable just forward of the viewing screen so that the image on the plate is viewable in conjunction with the image of the viewer's face. In such apparatus the light intensity of the image is low because of the limited light from the viewer's face and the diffusion thereof by the screen.

In the '757 patent, the light from the viewer'face is reflected off a pair of mirrors in the apparatus, with a lens focusing the facial image at a plane within the apparatus. Disposable within that plane are the transparent plates containing the hair style, with the facial image and the hair style image being refocused for viewing by a second lens. Facial image intensity is improved in this apparatus, though the balance between images and the quality of the images are limited.

In the '860 patent, an individual slide on a turret-like slide holder is illuminated by a lamp, with the light passing therethrough then passing through an appropriately colored segment of a turret-like color wheel. That image then proceeds through a series of lenses being focused thereby for viewing by the viewer through a partially reflecting mirror, which mirror also presents the viewer's facial image to present a composite image of a viewer's face with the coiffure superimposed thereon. In an alternate embodiment, the light passing through the slide holder and color wheel is focused on a diffusion screen so that the image thereon is viewable through the partially reflecting mirror.

In the foregoing systems color of the hair style could not be reproduced with any degree of accuracy, particularly with an accuracy required to provide a basis for the viewer's actual selection of the desired color. In addition, in the '675 and '757 systems, each slide had to be manually placed in position generally requiring an operator of the equipment to obtain the desired effect and to take the required care with the relatively delicate slides. Similarly in the '860 system, operation was most convenient with a machine operator, as the color wheel and slide holder are too remote for the convenient manipulation of a viewer. In that regard the systems of the '675 and '860 patents are specifically set up so that an operator may also view the image from behind or above the apparatus as an aid in the operation thereof. Finally, even in the '860 system a number of coiffures and colors which could be presented were highly limited, as the number of slides disposable on the slide holder and colors on the color wheels are necessarily limited.

Another fashion previewing apparatus is shown in U.S. Pat. No. 2,061,378. That system is similar to the system of the '675 patent with respect to the presentation of the facial image on a back lighted screen, though includes a film projector therebehind projecting through a mask to present the coiffure on the back of the viewing screen also, the mask masking the face and neck regions though freely lighting the regions surrounding the coiffure. Other examples of related viewing apparatus include those described in U.S. Pat. Nos. 2,232,110; 2,297,844; 2,711,667; 2,729,141; 2,796,801 and 3,507,570. These devices however as substantially different in purpose and function and accordingly not described in detail herein.

As previously mentioned, prior art fashion previewing apparatus has not generally allowed the accurate reproduction of color to form the basis of a person's selection of a new hair color. For this purpose the manufacturers of hair coloring products generally provide various aids which more accurately allow the selection of a new color and the determination of the formulas and procedures required to change from a given hair color to a selected new color. By way of example, Clairol Incorporated puts out what they refer to as color rings which comprise swatches of hair-like synthetic fiber colored and appropriately identified to correspond with the various colors obtainable through the use of Clairol products. The various swatches on the color rings may be compared with a person's existing hair color to obtain an identification of the "before" parameters. Clairol also puts out a hair color formula dial having the various colors attainable by a given series of their coloring products and an inner rotatable member which when aligned with the person's present hair color will reveal the formulations and procedures required to change hair color to each of the other colors. While perfect uniformity and predictability of color change is not achieved, reasonable accuracy results from the use of the color rings and hair color formula dial. Of course the selection of a new hair color based on the use of the color rings does not allow one the advantage of viewing oneself with the illusion of a coiffeur of the selected color.

BRIEF SUMMARY OF THE INVENTION

A device for determining the hair coloring products to be used to change a user's present hair color to a new hair color. The device includes a keyboard for entering a designation which identifies the user's present hair color and the desired hair color. The user also enters data to identify the particular line of hair coloring products which the user desires to use. The device then responds to such data by displaying the designations of hair coloring products of the chosen line which will change the user's present hair color to the new hair color.

BRIEF DESCRIPTION OF THE DRAWINGS

FIG. 1 is a perspective view of the preferred embodiment of the invention.

FIG. 2 is a top view of the embodiment of FIG. 1 with a forward portion of the apparatus cutaway to show details thereof in cross-section.

FIG. 3 is a face view illustrating the nature of the projected image.

FIG. 4 is an exemplary cross-section of the forward lens of the apparatus.

FIG. 5 is a perspective view of an alternate embodiment of the present invention.

FIG. 6 is a top view partially cutaway of the embodiment of FIG. 5.

FIGS. 12 through 14 are logic flow diagrams illustrating the programming of a microprocessor utilizing the look-up table format identified with respect to FIGS. 8 through 10.

DETAILED DESCRIPTION OF THE INVENTION

Figure 7:
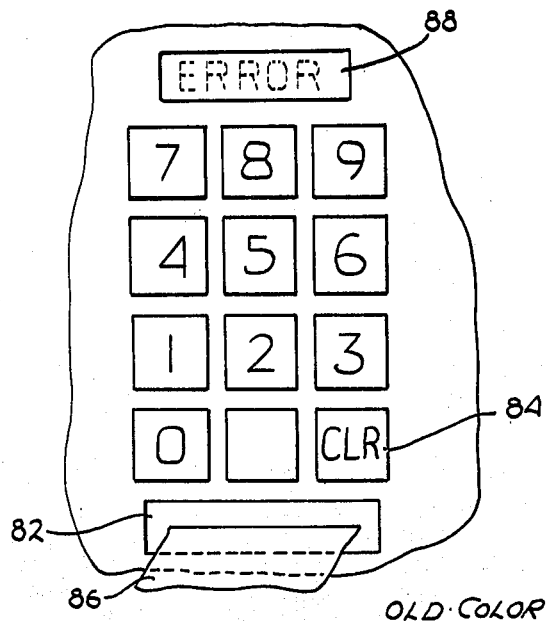
FIG. 7 is a front view of a portion of the embodiment of FIG. 5 taken on an expanded scale.

The present invention is a fashion previewing apparatus particularly suited for the previewing of personal fashion items through the illusion of superimposition of the image of the fashion items over or around the image of the viewer, thereby allowing the viewer to make a judgment regarding his personal tastes in appearance without requiring the "trying on" of the particular fashion item. This is particularly desirable in instances where economic interests limit inventories of the actual item which might be used by a perspective customer such as, by way of example, eyeglass frames, and in instances where the "trying on" of the fashion item by its nature comprises the actual purchase or use of the product or service being previewed. Examples of this latter category include the previewing of hair styles and color which otherwise are not susceptible to the more usual "trying on", though it is to be understood that the present invention is also directly applicable to the previewing of a wide range of products and services ranging from various forms of wearing apparel such as hats and the like to the previewing of cosmetic and corrective surgery, orthodontics and the like. Since the preferred embodiment of the present invention is used for the previewing of hair styles and color, and such embodiment is an ideal exemplary embodiment because of the need for accurate overlying of a hair style and color on a facial image and the highly discriminating tastes of purchasers of hair coloring products and hair dressing services, such embodiment will be used as one of the exemplary embodiments herein.

Now referring to FIG. 1, a perspective view of one embodiment of the present invention may be seen. The fashion previewing apparatus, generally indicated by the numeral 20, is characterized by an enclosure 22 having a front panel surface 24 on which a projected image 26 of the hair color and style to be previewed is superimposed over a reflected facial image 28 of the viewer, generally indicated by the numeral 30. Other characteristics and features of this embodiment which may be seen in FIG. 1 include a circular magazine 32 in the upper rear portion of the previewing apparatus for holding a plurality of film slides, and various manual controls 34 for controlling certain viewer functions. In addition, a remote control unit 36 is coupled to the apparatus 20 through a cable 38 so that the viewer using the apparatus may control the selection of hair styles and color being presented from the viewing position without an operator being required. While the controls may be varied depending upon the nature of the subject matter being viewed, in the case of hair styles and color, four basic hair styles will allow a viewer to select one of the styles of the viewer's preference and then cycle through the various colors within that style sequence for color selection. Accordingly, appropriate controls for a device of this type may include an advance control 40 for presenting the slides in sequence, a reverse control 42 for allowing the viewer to "back-up" within a group of slides, and a field control 44 for advancing between fields, i.e. from any position within the group of slides for a particular hair style to the next hair style. This in effect allows a rapid advance through the various hair styles to locate the one for which the viewer desires to review the specific color variations. In that regard, major slide group headings may be placed on the carousel magazine or tray 32 in a manner readily visible to the viewer as the magazine rotates with the indexing, so as to also be useful in identification of at least gross location. Fine location, i.e specific identification of individual slides being used, and more specifically the identification of the color, coloring product identification and/or other characterization of the slide being viewed may also be on the carousel or may be on the slide itself so as to be visible by the viewer such as, by way of example, in region 46.

Now referring to FIG. 2, a top view of the apparatus of FIG. 1 with the forward portion thereof cut away to show that region in cross-section may be seen. Forward of the screen 48 of the projector is a lens 50 supported from a forward frame 52 by clamps 54 attached to the forward frame by screws 56.

The lens 50 in the preferred embodiment has a convex outer surface and a concave inner surface. In addition, the outer surface is coated with a partially reflective coating 60 (see FIG. 4) and the inner surface is coated with an anti-reflective coating 62. When the viewer 30 is positioned in front of the apparatus as illustrated in FIG. 2, light from the viewer's face is partially reflected off the coating 60 so that the viewer will see the reflected image. The image will be smaller than life size because of the convex curvature of the reflective surface. Of course, the viewer's hair as well as the background, etc. are also reflected back so as to theoretically be visible to the viewer, though as shall subsequently be seen, the viewer's perception of these reflected images is minimized. A thin transparent protective coating 24 may be placed over the partially reflective coating 60, or as an alternative a transparent plate (glass or plaster) may be placed in front of the lens, though care must be taken to avoid creating ghost images as a result of reflections from the plate.

As previously mentioned, the projector projects a color image of the desired hair style onto the rear projection screen 48 at the front of the projector, which image is viewable through lens 50 and the partially reflecting surface 60 thereof. In essence, the projected colored hair style is superimposed over the facial image of the viewer so that the illusion of the viewer wearing the hair style and color projected is created.

In prior art equipment wherein a second image is to be superimposed over a reflected image, the second image is commonly presented on a transparent plate, with the backround region either being black or transparent (though masking of the face and neck regions was known). In the present invention, however, the image on the slides and thus the projected image viewable through the front of the apparatus as shown in FIG. 3 is characterized by the desired color hair style 64, a blackened face and neck region 66 and a complimentary colored background region 68. (The word colored as used herein with respect to the background on the slides is used in the general sense and includes the colors white and grey, as opposed to clear and black.) The colored background is believed to be highly beneficial not only for providing a pleasing image but also for maximizing the quality of the image and minimizing certain undesirable characteristics. In particular, if the background region of the slides were clear, this would create bright white regions on the rear projection screen 48 surrounding the projected hair image which would also be seen by the observer. The high intensity in these areas would act as a veiling glare basically causing the viewer's eyes to close down substantially so that the reflected facial image would be perceived very dimly. Further, the high intensity in the background region coupled with the partial internal reflections of that light from the various surfaces of the lens would cause some illumination of the center or facial region thereby further veiling the facial image and diluting the color values. On the other hand, with a blackened background region the foregoing effects are eliminated, though ghosting may appear for other reasons. Accordingly, by making the background region of the slides colored to present a soft complimentary background for the projected hair style, a pleasing background may be readily created having sufficient light to subdue the external reflections, but insufficient to significantly effect the apparent intensity of the reflected facial image and the projected hair style. Of course the face and neck region is blackened for the reason that the only desired light in this region is that of the reflected facial image.

The quality of the illusion created is dependent upon a number of parameters including the appropriate sizing of the projected hair image for the reflected facial image, the realism of the color, the balance of light intensity between the reflected and projected images, etc. Balancing of the intensity of the two images may be achieved by the appropriate selection of the partial reflectivity of the lens coating and extent of illumination of the viewer's face. In that regard, in the preferred embodiment fluorescent bulbs 70 are provided at each side of the apparatus to provide predetermined illumination of the viewer's face. Separation of this lighting away from the viewing region a substantial amount is desirable to again avoid veiling of the images, and accordingly separate lighting to the sides of the apparatus may also be used.

Now referring to FIGS. 5 and 6, another embodiment of the present invention may be seen. This embodiment is similar to the embodiment of FIGS. 1 through 4 in many respects, being simpler in certain design aspects, and incorporating a number of mechanical and electronic features making it ideal for use in retail outlets for hair coloring products as well as in beauty salons. In particular, the advantages of being able to accurately preview a new hair color by creating the illusion of the customer or perspective customer actually wearing a hairstyle of that color have already been described. This embodiment, however, goes further by allowing a customer or perspective customer to also identify the present hair color and to receive specific instructions regarding formulas and procedures for changing from the existing hair color to the selected hair color. In the specific embodiment disclosed the formulas and procedures are printed out on tape so that the perspective customer is given a printed record of the products and procedures required to achieve the desired hairstyle. Obviously by identifying the formulas by way of a specific manufacturer's trademark, this embodiment will greatly promote the sale of that manufacturer's products when placed on a retail store counter. Also, as shall subsequently be seen, because of the operational simplicity of this embodiment, perspective hair coloring product customers may readily use the device without the attention or instruction of the clerk. In fact, this embodiment will provide the previewing hereinbefore unattainable and automatically specify products and procedures normally well beyond the capabilities of the average retail clerk, all of course without the attention of the retail clerk.

The embodiment shown in FIG. 5 is generally characterized by a base 72 supporting a main housing 74 within which the main functional apparatus is housed. At the front of housing 74 is a screen 76 generally corresponding to the front panel 24 of the embodiment of FIG. 1. To each side of the screen or front panel 76 are a plurality of openings 78 behind which are mounted appropriate lights for illuminating the user's face in a controlled manner to obtain proper contrast between the facial image and the projected hairstyle and color image. At the side of the screen 76 is a small keyboard-like device 80 and a printer generally indicated by the numeral 82. Also, under the forward portion of the housing 74 and fastened to the base 72 are a plurality of colored synthetic hair swatches 84 corresponding to the hair coloring product manufacturers colors. In the specific embodiment each color also has associated therewith a manufacturers color identification (frequently trademarks) and specific two digit number, which color identification and two digit number associated with each haircolor are presented in region 86 so as to each be associated with the corresponding color swatch.

For purposes of specificity in the disclosure of an exemplary embodiment, the embodiment will be described with respect to Miss Clairol products manufactured by Clairol Incorporated (Miss Clairol and certain other marks mentioned herein are registered trademarks of Clairol Incorporated). The Miss Clairol line (at least as identified on a hair color formula dial put out by Clairol) has twenty-eight distinct colors, each of which is identified by a general description, a two-digit number and a Clairol color designation or trademark. By way of example, the color generally identified as True Ash Blond is identified as number 32 Moon Haze, Moon Haze being a registered mark of Clairol. (The twenty-eight colors are not numbered in sequence, but all contain two digits with the first digit always being non-zero). When one places the center arrow of the rotatable panel on the Clairol hair color formula dial on any one of the twenty-eight colors corresponding to the closest current hair color, twenty-seven small window-like openings in the other twenty-seven segments of the rotatable panel expose twenty-seven separate printed formulations and other directions. Each of these twenty-seven printed instructions and formulations are associated with a respective one of the other twenty-seven colors, so that to change from the color on which the arrow is centered to one of the other twenty-seven colors, the formulations and directions are visible through the respective window associated with the new color. By way of specific examples, to change from Light Ash Brown to a True Ash Blond, the formulation is one ounce of Number 32 (True Ash Blond), one ounce of Number 28 (Light Ash Blond) and two ounces of developer. To change from Light Ash Brown to a lighter color such as a Honey Blond, the hair is first pre-lightened and then a formulation of two ounces of Number 41 (Honey Blond) and two ounces of developer are used.

Now referring to FIG. 6 a portion of the front of housing 74 showing the keyboard 80 and the printer 82 may be seen. On the keyboard 80 is a button 84 labeled CLR (clear). The keyboard itself comprises twelve switches, ten of which are 0 through 9, and anyone of which may be selected at any time. The printer 82 is of the self-feed type, supplied by a roll of paper behind the panel and advanced automatically as appropriate so that a user of the device may readily tear-off the printed instructions, once they have been printed by the printer and advanced to an appropriate tear-off position. Once the user of the device identifies the current hair color by number (two-digit number) and similarly identifies the selected new color by number, the user depresses the clear button 84, then enters the two-digits of the present color followed by the two digits of the newly selected color. This causes circuitry, to be described herein, to print-out the specific procedure and formulation required (generally using the trademarks of the specific company to identify the products) and to advance the paper tape 86 dispensed therefrom during and after printing so that the user may readily tear-off the printed instructions for use as a shopping memo and for the mixing of the products purchased.

In order to provide the conversion between the data entered through the keyboard to the formulations and instructions for obtaining the desired hair color, a microprocessor based processing and control system is provided in the exemplary embodiment. Certain details of this exemplary embodiment will be given herein, though it is to be understood that such information is given by way of example only, and not as by way of limitation, or even as being the best possible manner of achieving the desired result, though at the present time it represents the best contemplated approach. Specifically the microprocessor which is used is an 8 bit microprocessor system which includes read only memory (ROM) for program and other information storage, and some random access memory (RAM) for temporary data storage. Before providing a detailed description of the circuitry, however, a description will be given of the manner of organizing the input, processing and output data so as to take advantage of the capabilities of such a processor.

The twenty-eight colors on the hair color formula dial under consideration are numbered with various numbers ranging from a low of 12 to a high of 68. In addition, the various formulations used to change from any of the twenty-eight colors to any of the other twenty-eight colors include two colors beyond the twenty-eight, giving thirty total colors. If each of the two digit numbers entered by the keyboard is converted to a unique binary number utilizing a look-up table for the conversion, each of the thirty colors may be represented by a unique five bit binary number. In addition, an examination of the 756 combinations (28 times 27 combinations) indicates certain patterns which may be used to formulate relatively simple algorithms for converting or translating two five bit binary numbers representing the old and the new hair colors to the specific preparations and procedures for achieving the new hair color. In particular, 234 of the combinations call for a standard prelightening step, which prelightening step is always followed by a mixture of 2 ounces of the new hair color and 2 ounces of developer. Consequently, for these 234 combinations, the mere recognition that prelightening is required (coupled with the fact that the desired hair color has already been identified) provides all the information required for the products to be used to achieve the desired result.

Figure 8:
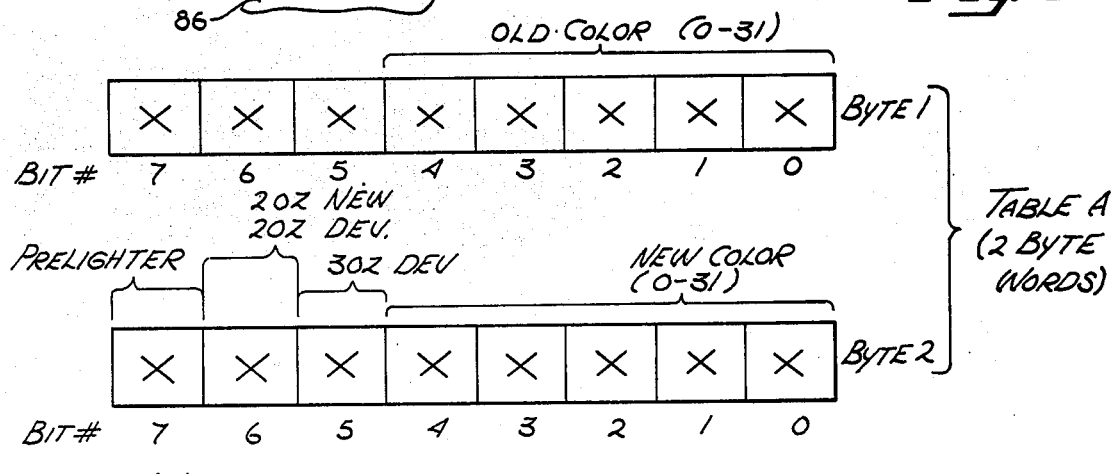
FIGS. 8 through 10 provide exemplary data bit assignments for look-up tables for converting old and new color designations to hair product designations.

Of the remaining 522 combinations, 364 of them call for the use of a mixture of one color and developer. Of the 364 combinations, 362 of them call for the use of 2 ounces of the desired color and 2 ounces of the developer, with one calling for 2 ounces of the new color and 3 ounces of developer, and the remaining one calling for 2 ounces of a different (known) color and 2 ounces of developer. Consequently, for these 598 combinations (364 plus 234) a look-up table may be constructed in read only memory using two eight bit bytes for each color combination. In particular, numbering the eight bits if each byte zero through seven, bits zero through four of the first byte may be used to identify the old color and bits zero through four of the second byte may be used to identify the new color. Thus when a user enters the old color number followed by the new color number, the microprocessor will scan the look-up table to find a two byte word wherein there is a match in the first five bits of the first byte for the old color number, and simultaneously a match in the first five bits of the second byte for the new color number. This is illustrated in FIG. 8, which shows the identification of bits in each of the two bytes of the two byte word stored in this look-up table, identified for subsequent reference as Table A. It will be noted from this Figure that of the remaining six bits, three bits are used for additional identifications. In particular, bit seven of byte two is used to indicate whether the prelightening step is used (a yes or no indication) which if used will initiate an appropriate output routine as subsequently described herein. If this bit indicates that the prelightening step is not used, then bit six is tested to determine whether the preparation comprises a mixture of 2 ounces of the new color and 2 ounces of developer. If it does, the appropriate output routine for this combination is initiated. Finally, if bits 7 and 6 indicate that no prelightening step is used and the mixture is not 2 ounces of the new color and 2 ounces of developer, bit 5 is tested to determine whether or not 3 ounces of developer is to be used. If it is, this identifies one of the remaining two combinations hereinbefore described, whereas if the indication is negative, then the other of the remaining two combinations is specified. Accordingly, a look-up table (Table A) comprising a series of two bit words may be used to store all information required to initiate the appropriate output commands for 598 of the 756 combinations. (Thus look-up Table A comprises 2×598=1,196 eight bit bytes.)

Figure 9:
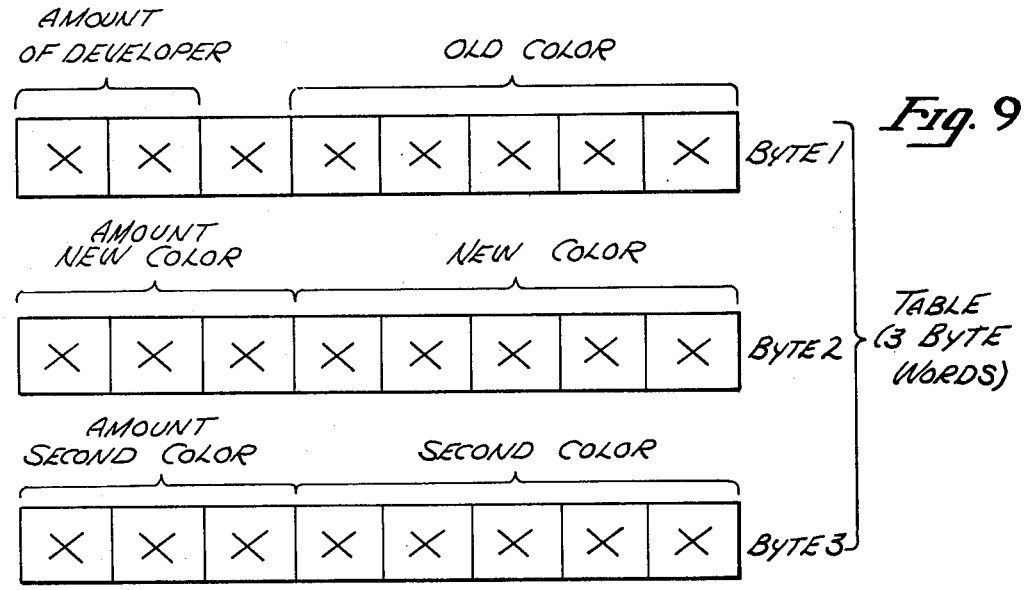

Of the remaining 158 combinations, 156 of them have no prelightening step and use two colors, one of which is always the desired new color. Consequently, a second look-up table, referred to herein as Table B, may be constructed comprising three byte words as shown in FIG. 9. In addition to the designation of the old color in five bits of the first byte and the new color as five bits of the second byte, the second color is contained in five bits of the third byte. Further, an examination of the hair color formula dial shows that for these combinations the amounts and proportions of colors and developer vary, the number of different amounts of color designated being 7 (including the 2 ounce designation). Three different designations are given for the developer. Accordingly, the remaining 3 bits of the second byte is used to specify the amount of new color, the remaining 3 bits in the third byte to specify the amount of the second color, and two of the remaining 3 bits of the first byte being used to designate the amount of developer.

Figure 10:
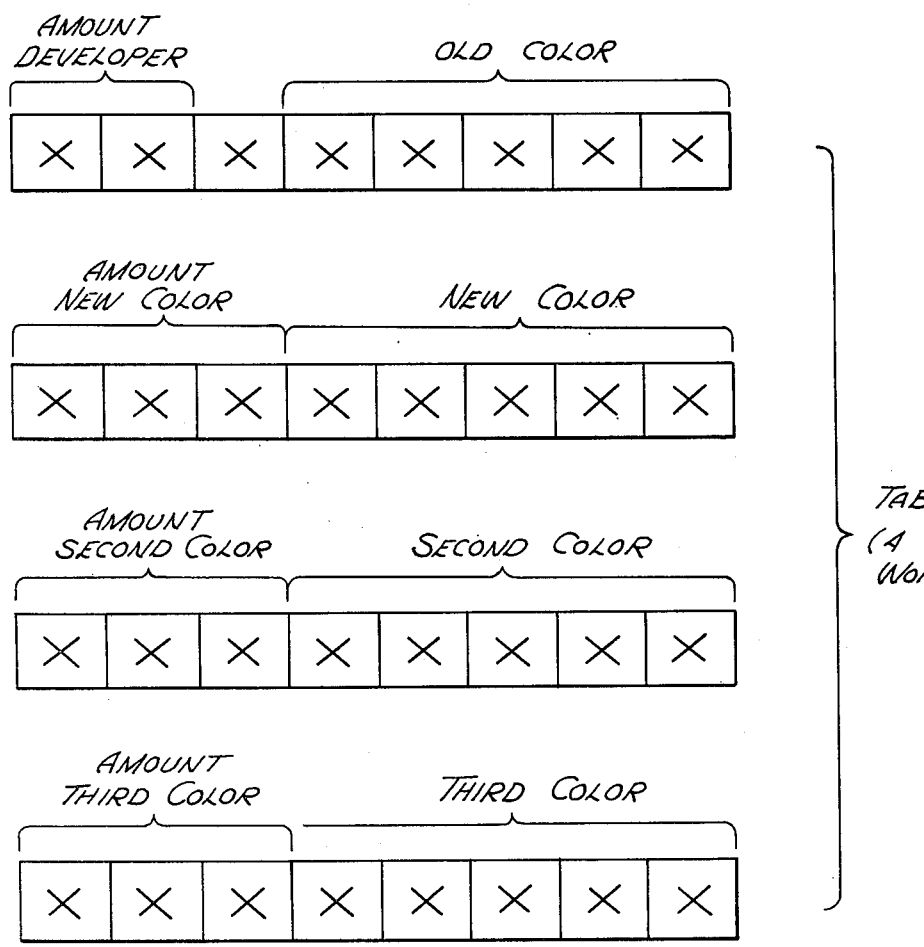

Finally, for the remaining two combinations there is no prelightening step, a mixture of three colors and developer is used, and one of the three colors is always the selected new color. In addition, the amounts of color and developer fall within a sub-set of the previously described amounts for Table B. Accordingly for these two combinations Table C may be created (see FIG. 10) containing four byte words, the first three being the same as in Table B, and the fourth merely specifying the third color and the amount thereof. Obviously, since there are only two combinations which fall into this general classification. Table C is only comprised of two four byte words (or eight bytes total).

Figure 11:
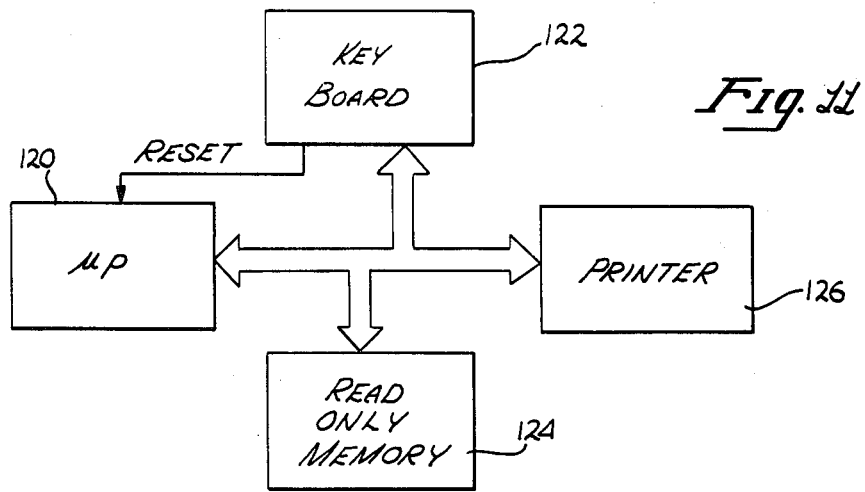
FIG. 11 is a schematic representation of a microprocessor based system for converting old and new hair color designations to hair coloring product designations using a microprocessor having on chip temporary storage and off chip read only memory program and look-up table storage.

In accordance with the foregoing, it may be seen that all the information for the 756 combinations allowable on the hair color formula dial may be stored in read only memory in 1,672 eight bit bytes for subsequent interrogation and use based upon the color combination entered through the keyboard by a user of the equipment. The manner of use of the look-up table and the general logic flow in the microprocessor based system shall be herinafter given, though first a schematic of the microprocessor system will be described. In particular, referring to FIG. 11, a schematic representation of a suitable microprocessor based system may be seen. The microprocessor 120 shown in this Figure is presumed to be of the type having some internal data storage so that separate random access memory is not required (though obviously could be used if temporary data storage were not provided on the microprocessor itself). A suitable microprocessor for such a purpose may include the 8035 manufactured by Intel Corporation of Mountain View, Calif. This processor has no on-chip program memory, though includes a 64×8 random access memory for temporary storage. The device also has, among other things, an eight bit bidirectional data bus, two I/O ports and three additional lines giving it a total capacity (without expansion) of 27 I/O lines. It also has a reset line for initialization purposes. The microprocessor is coupled to the keyboard 122, a read only memory 124 and printer 126, only one bus system being shown in the figures, though of course functionally the keyboard, read only memory and printer must be separated either through the use of separate I/O lines and/or through unique addressing (which may require some external decoding). The keyboard 122 may be of any conventional design, and is most conveniently debounced through the use of conventional software debouncing techniques well known in the microprocessor arts. The read only memory 124 may be any conventional read only memory specially programmed, of course, for this particular application, though a 16k ROM organized as a 2k by eight is most convenient. While the entire look-up table hereinbefore described may readily be stored on a single read only memory chip leaving some program storage space, the read only memory 124 may require a higher storage capacity (i.e. a second device or a larger storage chip) to store both the primary look-up table and the program. Suitable read only memories, however, are well known in the art such as by way of example, the 2316E manufactured by Intel Corporation.

Exemplary logic diagrams for the programming of the microprocessor system may be seen in FIGS. 12 through 14, FIG. 12 presenting the logic for entering data from the keyboard, FIG. 13 presenting the logic for use of look-up Table A, and FIG. 14 the logic for the use of look-up Tables B and C. While these logical diagrams are exemplary only, it will be seen that the program may be particularly simple and readily stored in a read only memory of reasonable size.

It may be seen from FIG. 12 that the program is initiated by a reset signal to the microprocessor (see also FIG. 11) caused by the operator's depression of the CLEAR button 84 (FIGS. 5 and 7). Thereafter the microprocessor repetitively scans the keyboard until one (and only one) key is depressed. If that is the first number of a two digit hair color designation, the microprocessor then scans the keyboard to determine when that key (and all the rest of the keys) is up, after which the keyboard is repetitively scanned to look for another key depression. After the depression of the second key, the two digit number that was entered is converted to a 5 bit number (block 130 of FIG. 12) using a separate look-up table for this purpose. If the two digit number cannot be found in this look-up table indicating that an improper two digit number was entered, this will be detected and the program terminated by the turning ON of a light illuminating an error indication as shown by the indicator 88 of FIG. 11. Assuming that the two digits entered were proper, the conversion of those two digits (representing the old hair color) to the 5 bit binary number will be completed and the answer temporarily stored. Thereafter the microprocessor will determine that only the first two digits representing the old hair color had been entered, at which time the keyboard will be tested for all keys up and the prior sequence repeated for the entry of the two digits indicating the new hair color. Thus, on entry of both the old color and the new color (four digits total) the program proceeds to the logic diagram of FIG. 13.

In FIG. 13 the microprocessor tests the 2 byte words of look-up Table A to find the 2 byte word having the same old color and new color designations as entered through the keyboard and temporarily stored. Assuming such a two byte word is found, the word is tested to determine whether prelightening has been specified (determined by the bit 7 of the second byte of the 2 byte word as shown in FIG. 8). If prelightening is specified, then a predetermined print routine I is initiated, printing out specific instructions such as:

Prelighten
2 ounces Clairol No. xx
2 ounces Clairol Developer

In this print-out, of course, the xx will be the new hair color number as read by the print routine, either from the new color as entered and temporarily stored or from the corresponding byte of the 2 byte word in the look-up table for which a match in the old and new color was obtained. If a prelightening step is not designated, then the second byte of the 2 byte word from Table A is tested to determine whether 2 ounces of color and 2 ounces of developer is specified. If so, print routine II will be initiated to print out the following:

2 ounces Clairol No. xx
2 ounces Clairol Developer

Again the xx refers to the new color number. Finally if the information stored in that word of the look-up table indicates that 2 ounces of the new color and 2 ounces of the developer is not used, the data is further tested to determine whether 3 ounces of developer is used. If it is, print routine III will be initiated, thereby printing out the following as the only combination having no prelightening, using only the new color and having 3 ounces of developer.

2 ounces Clairol No. 12
3 ounces Clairol Developer

Finally, if 3 ounces of developer is not indicated, print routine IV covering this unique combination is initiated to print out:

2 ounces Clairol No. 48
2 ounces Clairol Developer

If the combination of old and new color is not found in Table A (during the tests of FIG. 13) Table B will be scanned. (See FIG. 14). If the combination of old and new color is found in Table B, print routine V will be initiated to print out the following:

x ounces Clairol No. xx
x ounces Clairol No. xx
x ounces Clairol Developer

In this case, of course, the x's represent coloring and developer amounts and coloring designations, with the first color always being the selected new color. Finally, if the old and new color combination is not found in Table B Table C is scanned, and if found therein, print routine VI is initiated printing out the following:

x ounces Clairol No. xx
x ounces Clairol No. xx
x ounces Clairol No. xx
x ounces Clairol Developer Depending upon exactly how the system is programmed, it may be possible for a combination of old and new color to be entered which will not be found in any of the look-up Tables A, B or C, in which case the error indication 88 (FIG. 11) should again be turned ON. (One such combination would be the entry of identical color numbers for the old and new color). Also, of course, upon completion of any of the print rountines, or on the receipt of the error signal, a halt instruction would be executed to put the system at rest prior to the next reset signal.

The foregoing data reduction technique and the devices used, of course, have been specified herein merely as exemplary of that which may be used for the present invention. By way of example, since 1672 bytes are used for the look-up table in the example hereinbefore given, a 2k byte read only memory storage capability would allow the storage of the look-up table and still leave 376 bytes of program storage, which may be adequate for a well compacted data reduction program. In such event, an Intel 8049 microprocessor could be used, which would eliminate the need for any external read only memory. Obviously other combinations could also be used such as on chip program storage and off chip look-up table storage, off chip temporary data storage etc., as will be readily apparent to those skilled in the art. Also if desired, the output information may simply be displayed on a display panel on the device, or displayed and printed out if desired. (A printed output has the advantage of operating as a shopping list, though the combination of a visual display and print out would provide the shopping list though still render the equipment usable in the event that it ran out of paper.) Actually, a voice output could also be incorporated if desired, as speech synthesizing programs and equipment are well known, though such form of output may be of value as much for its novelty as for its utility. Also, while the preferred embodiment utilizes a color designation right on the image being projected, such color designations could also be on the magazine containing the color slides. In fact, the color designation could be automatically read off the projector based upon the slide holder position, and automatically entered rather than entered by the user through the keyboard, though such an embellishment unnecessarily adds to the expense of the equipment and presents an opportunity for error because of the possible rearrangement of the slides all without significant increase in the convenience of use of the invention. These of course are only a few of the alternate forms which will be immediately obvious from the disclosure given herein.

The embodiment shown in FIGS. 5 through 7 is a particularly simple embodiment in that the housing 74 is configured internally so as to receive a carousel projector without modification thereof. For such a projector, either the remote control capability may be used, or alternatively a simple release button coupled with the operator's manual rotation of the magazine may be used. The housing 74 has a section extending into a relieved area of the base 72 below the shaft 90 on which the knob 92 is mounted. The relieved area of the base is flat, though the portion of housing 74 extending down and being supported thereby is curved, specifically with the radius having a center approximately at the center of gravity of the entire housing assembly 74, so that the apparatus, once tilted for convenient use, will tend to remain at that set angle. The knob 92, however, provides a locking means for locking the housing 74 at the desired angularity with respect to the base 72 as a result of the rod 90 on which it is mounted being threaded into an insert 94 in the opposite wall of the base 72. Thus, by rotation of the knob the base walls are locally deflected to tighten against the adjacent walls of the lower extension of the housing 74 to provide the desired locking action. Obviously, of course, other locking or friction inducing means may be disposed between the base 72 and the housing 74 to encourage the housing to remain at any set position.

Figure 15:
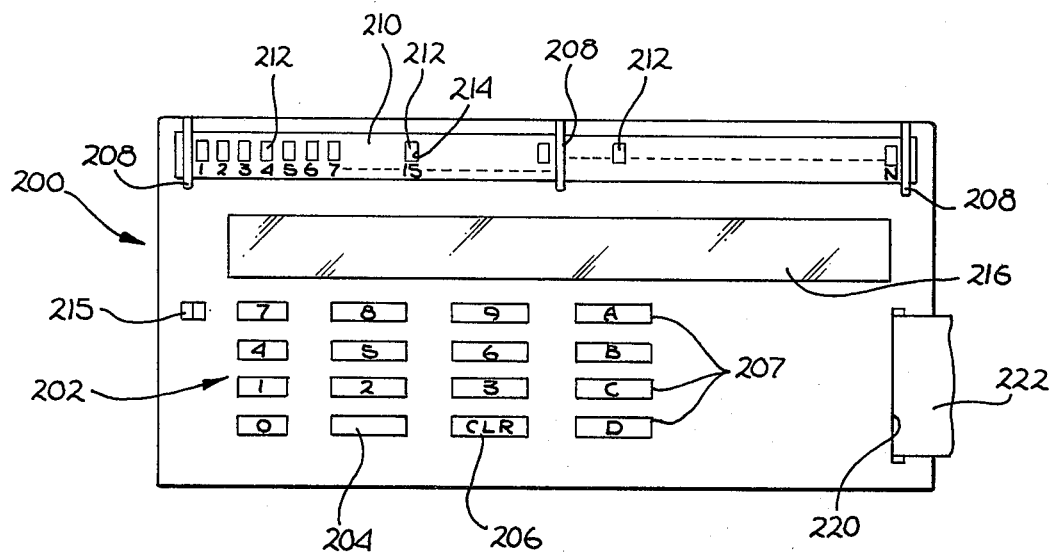
FIG. 15 shows a "hand-held" alternate embodiment of the invention.

Yet another embodiment of the invention is shown in FIG. 15. That embodiment does not have any "previewing" capability common to the previously disclosed embodiments, but has the advantage of being embodied in a device 200 in the approximate size, shape and layout of a hand-held calculator. The device 200 is provided with a numeric key pad 202 essentially identical to the keyboard-like device 80 shown in FIG. 5. Key pad 202 has the usual numeric keys representative of numerals 0 through 9, and in addition has a key 206 to clear erroneous entries and a cycle key 204 whose function will be described later.

Device 200 is provided at its top edge body portion with a suitable number of spaced apart clip means 208 for clipping therebeneath a strip 210 of material on which has been provided a plurality of areas 212 of preselected reference colors each of which areas 212 has associated with it a unique reference number 214. A faded color strip 210 may thus be readily replaced.

To use the device 200, a user first slides on-off switch 215 to the "on" position. The user then selects a strip 210 having reference colors thereon of a particular brand of hair coloring products or of a selected one of a number of different lines of hair coloring products made by a single manufacturer, such as commercial line, or consumer line. On the back of each strip 210 is printed the brand name of the hair coloring products and a corresponding identifying indicia. The user slips the chosen strip 210 underneath clips 208 and presses one of lettered keys 207 corresponding to the identifying indicia on the back of the selected strip, thus informing the device 200 of the identity of the brand name of hair color products which the user desires to use. The user would then press cycle key 204 to inform the device that entry of a piece of data is complete.

The user then matches her present color of hair to one of the plurality of areas 210 of preselected reference colors. The user then enters the corresponding reference number 214 into the device 200 and presses key 204 to identify the end of the piece of data. The user then selects that area 212, having a color closest to that color to which the user desires to change her hair, and enters the corresponding reference number 214 into the device and presses key 204.

After entry of the two references numbers 214, the internal electronics performs the operations schematically illustrated in FIGS. 12, 13 and 14, and determines what combination of hair coloring products should be used to change the user's hair to the desired color. When the determination is made, a portion of the necessary information is displayed in display window 216, which may be an LCD, or LED display and is preferably capable of alphanumeric display. Such display might appear as "PRELIGHTEN-CON". The appearance of the letters CON at the end of the display serves to inform the user that additional information follows. To display the additional information the user presses key 204. The next data displayed might be "1 OZ 17 - CON". The user then knows to use 1 ounce of hair coloring product number 17. Pressing key 204 reveals the next piece of data in the display window 216, e.g. "1 OZ 7". No "-CON" appears so the user knows this is the end of the output data. The user now knows that to change her hair to the desired color, using the hair coloring products of her selected brand, she must prelighten her hair and color it using 1 ounce of the manufacturer's hair coloring product identified by reference number 17 and 1 ounce of coloring product identified by reference number 7.

As an option, pressing key 204 could cause cyclical display of data and, in addition, activate a printing device on the interior of the device 200 to print the information displayed on a strip of paper 222 which would feed through slot 220. The user would then have a "hard copy" of the output of device 200.

The major advantage of this embodiment of the invention is of course its small size, light weight and extreme portability. In addition, the device 200 can be instructed to give its output in terms of coded hair coloring products of a number of different brands.

There has been described herein a new and particularly simple previewing apparatus which may be readily controlled by a user to preview any of a large number of selections. The apparatus in cooperation with the film slides used therewith provide high quality images with a soft background substantially free of veiling reflections. For previewing hair colors, one embodiment has been disclosed having the capability of translating or converting the present hair color and the desired new hair color to the specification of products or preparations and procedures for achieving the new hair color. In addition, a "hand held" embodiment has been disclosed which, while lacking the "previewing" capability of the other embodiments compensates for that lack with its extreme portability and capability to select between hair coloring products of different brands. Of course while preferred embodiments have been disclosed and described in detail herein it will be understood by those skilled in the art that various changes in form and detail may be made without departing from the spirit and scope of the invention.

What I claim is:

1. An apparatus for designating hair coloring products which will change an existing hair color to a new hair color, comprising:
    keyboard means for entering designations representative of an existing and a new hair color;
    electronic means responsive to said keyboard means for converting said designations of the existing hair color into a first coded signal and for converting said designations of the new hair color into a second coded signal;
    storage means for storing a plurality of formulations of hair coloring products which will change any of a plurality of existing hair colors to any of a plurality of new hair colors;
    output means responsive to said first and second coded signals for obtaining the formulation from said storage means corresponding to said first and second coded signals, whereby the hair coloring products which will change the existing hair color to the new hair color will be provided.

2. The apparatus according to claim 1 wherein said designations are determined by:

means for presenting a plurality of reference colors, each of which is associated with a designation, said existing color and said new color being associated with one of said plurality of reference colors, whereby the designation of the existing hair color and the new hair color can be determined, and wherein the formulations stored in said storage means corresponds to said reference colors.

3. The apparatus according to claim 1 wherein said output means is an electronic display device.

4. The apparatus according to claim 3 wherein said electronic means will cause said display device to display an indication to a user in the event that not all products can be displayed at one time, in which event the user, by depression of a preselected key can cause said apparatus to display additional products.

5. The apparatus according to claim 1 wherein said output means is a printer for providing a user with output in printed form.

6. The apparatus of claim 1, wherein said designations are determined by a plurality of means for presenting a plurality of reference colors, wherein each reference color is associated with a specific designation, said existing color and said new color being associated with one of said plurality of reference colors whereby the designation of the existing hair color and the new hair color can be determined, and wherein the formulations stored in said storage means corresponds to said reference colors, and wherein each one of the plurality of means for presenting has associated therewith an identifying indicia, and said keyboard means being provided with a plurality of keys, each of which correspond to the plurality of identifying indicia, whereby a user may change the mode of operation of said apparatus, to be compatible with a selected means for presenting, by depressing that key having an identifying indicia identical to the identifying indicia appearing on said means for presenting.

7. The apparatus of claim 1, wherein said electronic means, said storage means and said output means comprise a single chip computer.

8. A hand-held device, for designating hair coloring products to be employed by a user of the device, to change the user's present hair color to a new hair color, comprising:

means for presenting a plurality of reference hair colors each of said plurality of reference hair colors having associated therewith a unique designation;

keyboard means for entering designations representative of said present hair color and of said new hair color by selecting one of said designations associated with said reference colors to represent the present color and the new color;

storage means for storing a plurality of formulations which will change the plurality of reference hair colors to any other reference hair color;

electronic means responsive to said designations entered through said keyboard means, for selecting the formulation of hair coloring products from said storage means corresponding to changing the existing hair color to a new hair color; and output means, responsive to said electronic means, for providing a visible display of said formulations of hair coloring products.

9. The device according to claim 8 wherein:

said keyboard means is provided with a plurality of keys each of which is associated with a distinct identifying indicia corresponding to each one of the plurality of designations that appear on said means for presenting.

10. The device according to claim 8 wherein said output means is an electronic display device.

11. The device according to claim 10 wherein said electronic means will cause said display device to display an indication to a user in the event that not all hair coloring products can be displayed at one time; and said keyboard means is provided with a key, depression of which will cause said device to display the remaining hair coloring products.

12. The device according to claim 8 wherein said output means is a printer for providing a printed list of the formulation of hair coloring products.

13. The device of claim 8, wherein said designations are determined by a plurality of means, for presenting a plurality of reference colors, wherein each color is associated with a specific designation, said existing color and said new color being associated with one of said plurality of reference colors, whereby the designation of the existing hair color and the new hair color can be determined, and wherein the formulations stored in said storage means corresponds to said reference colors, and wherein each one of the plurality of means for presenting has associated therewith an identifying indicia, and said keyboard means being provided with a plurality of keys, each of which corresponds to the plurality of identifying indicia, whereby a user may change the mode of operation of said device, to be compatible with a selected means for presenting, by depressing that key having an identifying indicia identical to the identifying indicia appearing on said means for presenting.

14. The device of claim 8, wherein said electronic means, said storage means and said output means comprise a single chip computer.

15. An apparatus for selecting hair color products which will change an existing hair color to a new hair color, comprising:

keyboard means for entering designations representative of the existing and a new hair color;

storage means for storing a plurality of formulations of hair coloring products which will change any of a plurality of existing hair colors to any of a plurality of new hair colors, microprocessor means responsive to said keyboard means for converting said designations of the existing hair color into a first coded signal and for converting said designations of the new hair color into a second coded signal, wherein said microprocessor selects the formulation from said storage means in response to said first and second coded signals, and output means for displaying the formulation selected by said microprocessor means.

16. The apparatus according to claim 15 wherein said designations are determined by:

means for presenting a plurality of reference colors, each of which is associated with a designation, said existing color and said new color being associated with one of said plurality of reference colors, whereby the designation of the existing hair color and the new hair color can be determined, and wherein the formulations stored in said storage means corresponds to said reference colors.

17. The device according to claim 15 wherein said output means is an electronic display device.

18. The device according to claim 15 wherein said output means is a printer for providing a printed list of the formulation of hair coloring products.

19. The apparatus of claim 15, wherein said microprocessor means and said storage means comprise a single chip computer.

* * * * *